Nov. 6, 1928.
T. H. STRACHAN
WEIGHING SCALE
Filed Aug. 1, 1925     17 Sheets-Sheet 1
1,690,258
Fig. 2.
Fig. 1.
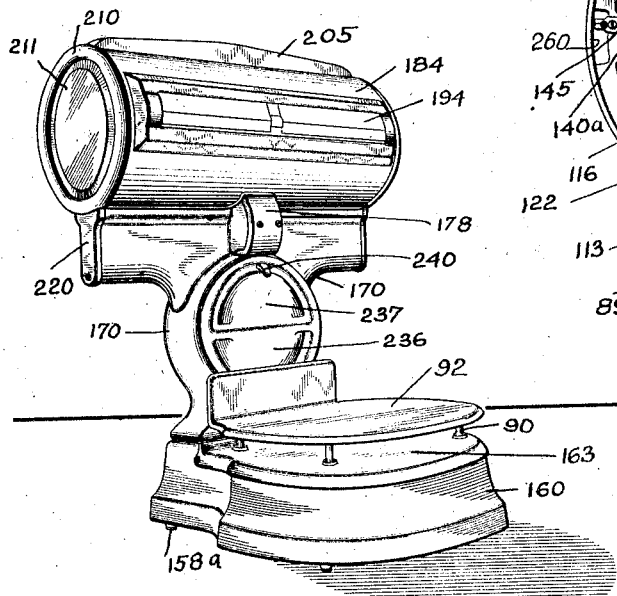
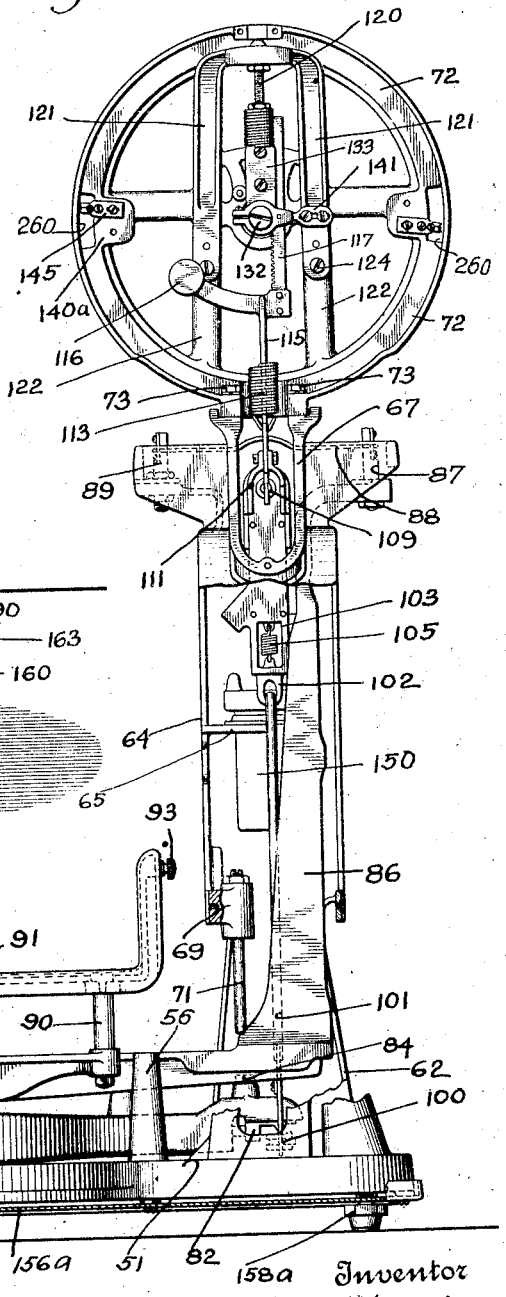
Inventor
T. H. Strachan
By his Attorneys
Cooper, Kerr & Dunham

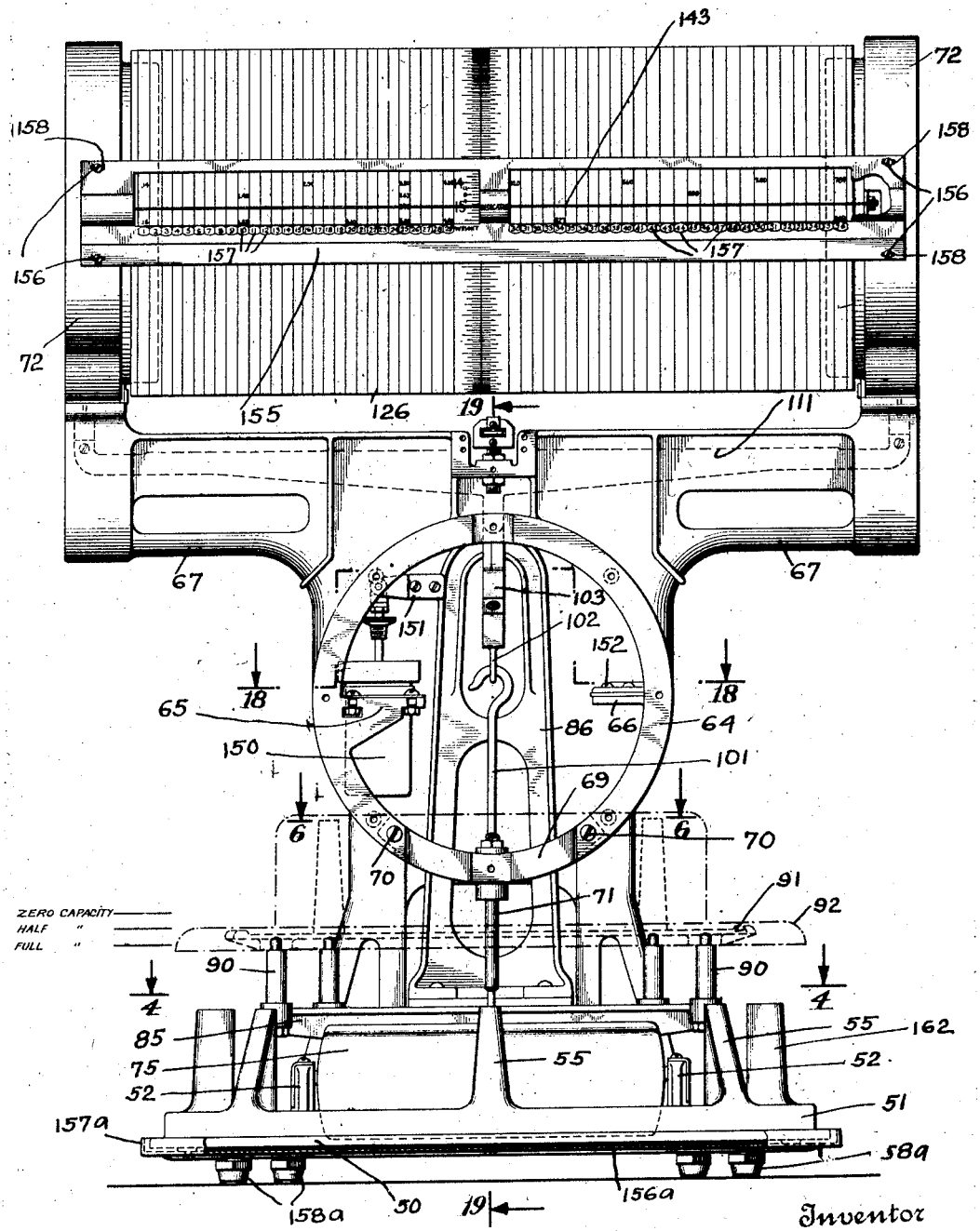

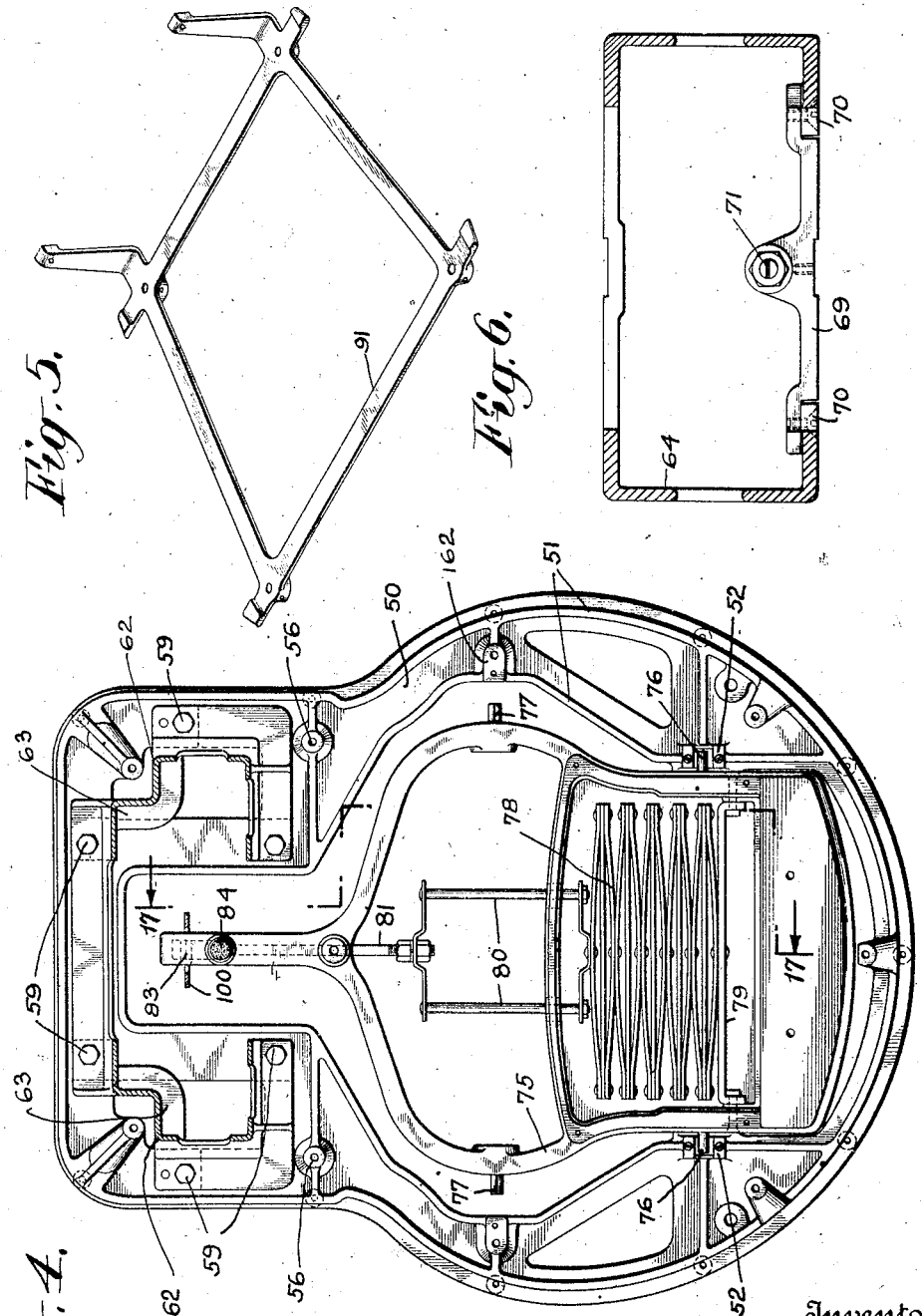

Nov. 6, 1928.
T. H. STRACHAN
1,690,258
WEIGHING SCALE
Filed Aug. 1, 1925    17 Sheets-Sheet 4
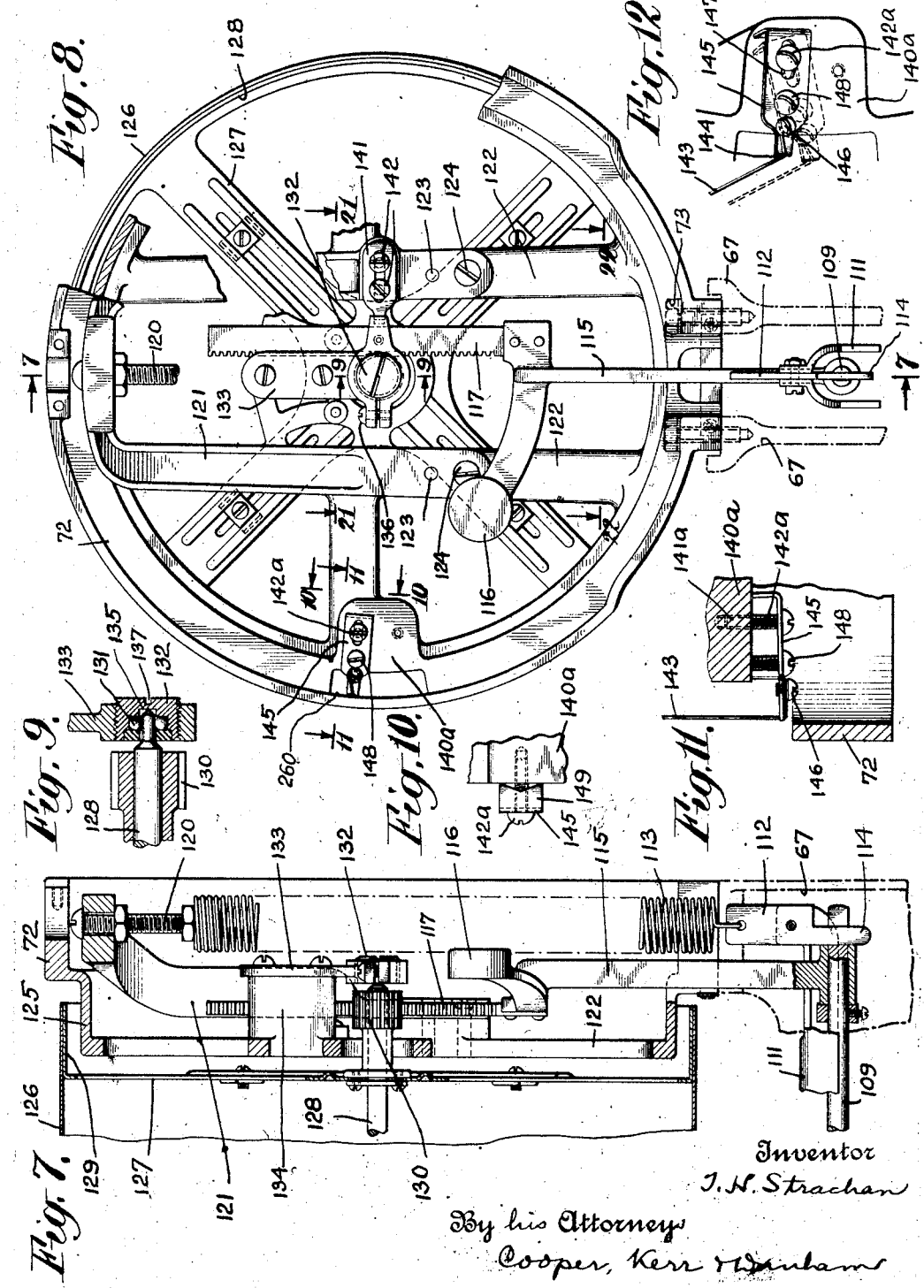
Inventor
T. H. Strachan
By his Attorneys
Cooper, Kerr & Dunham

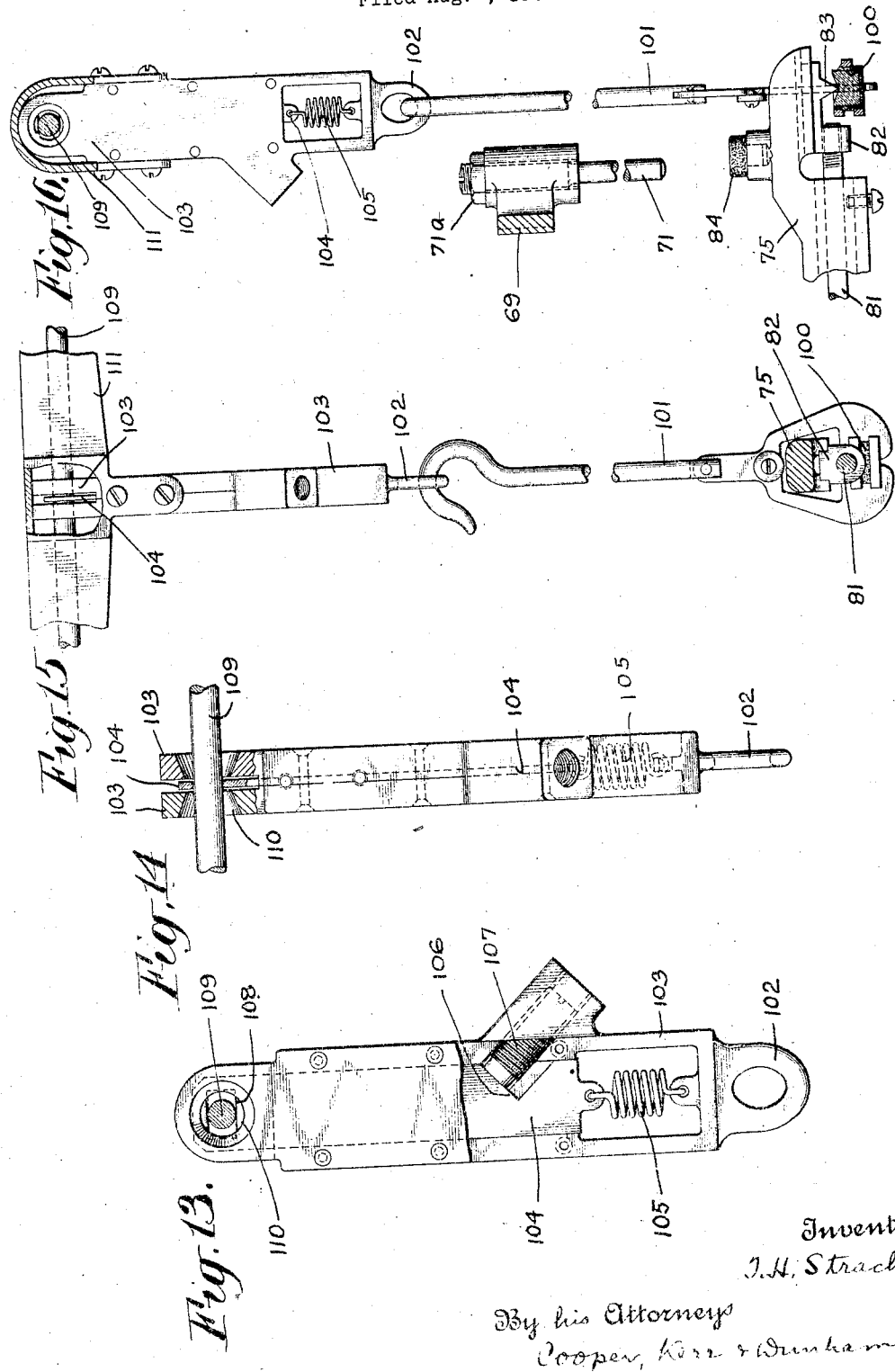

Nov. 6, 1928.　　　　T. H. STRACHAN　　　　1,690,258
WEIGHING SCALE
Filed Aug. 1, 1925　　　17 Sheets-Sheet 6
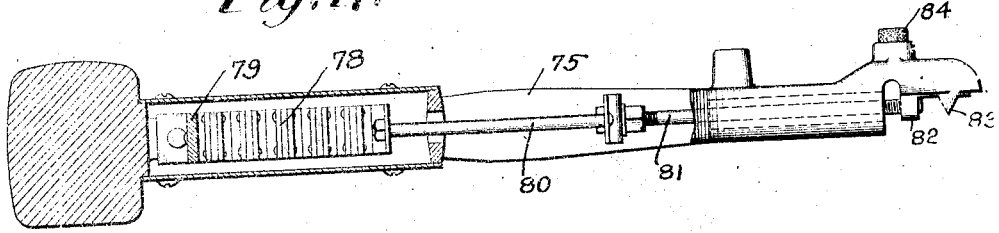
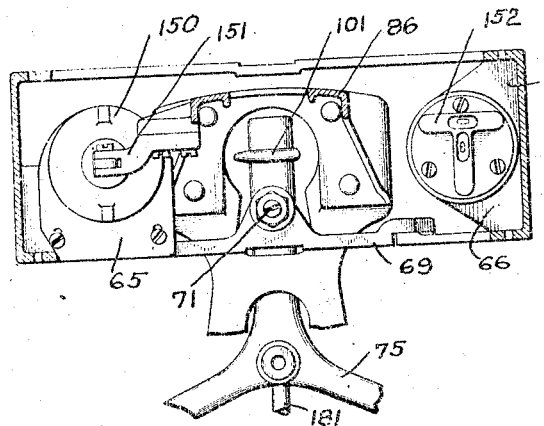
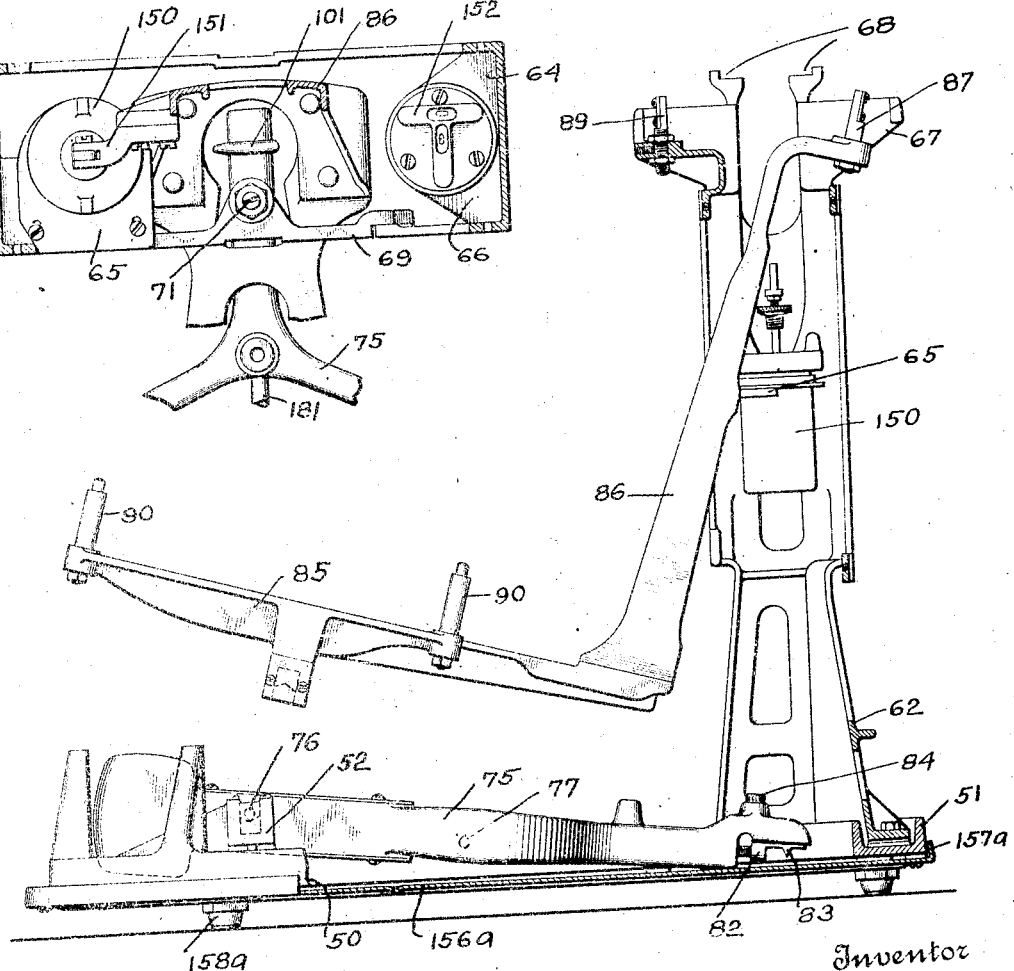
Inventor
T. H. Strachan
By his Attorneys
Cooper, Kerr & Dunham

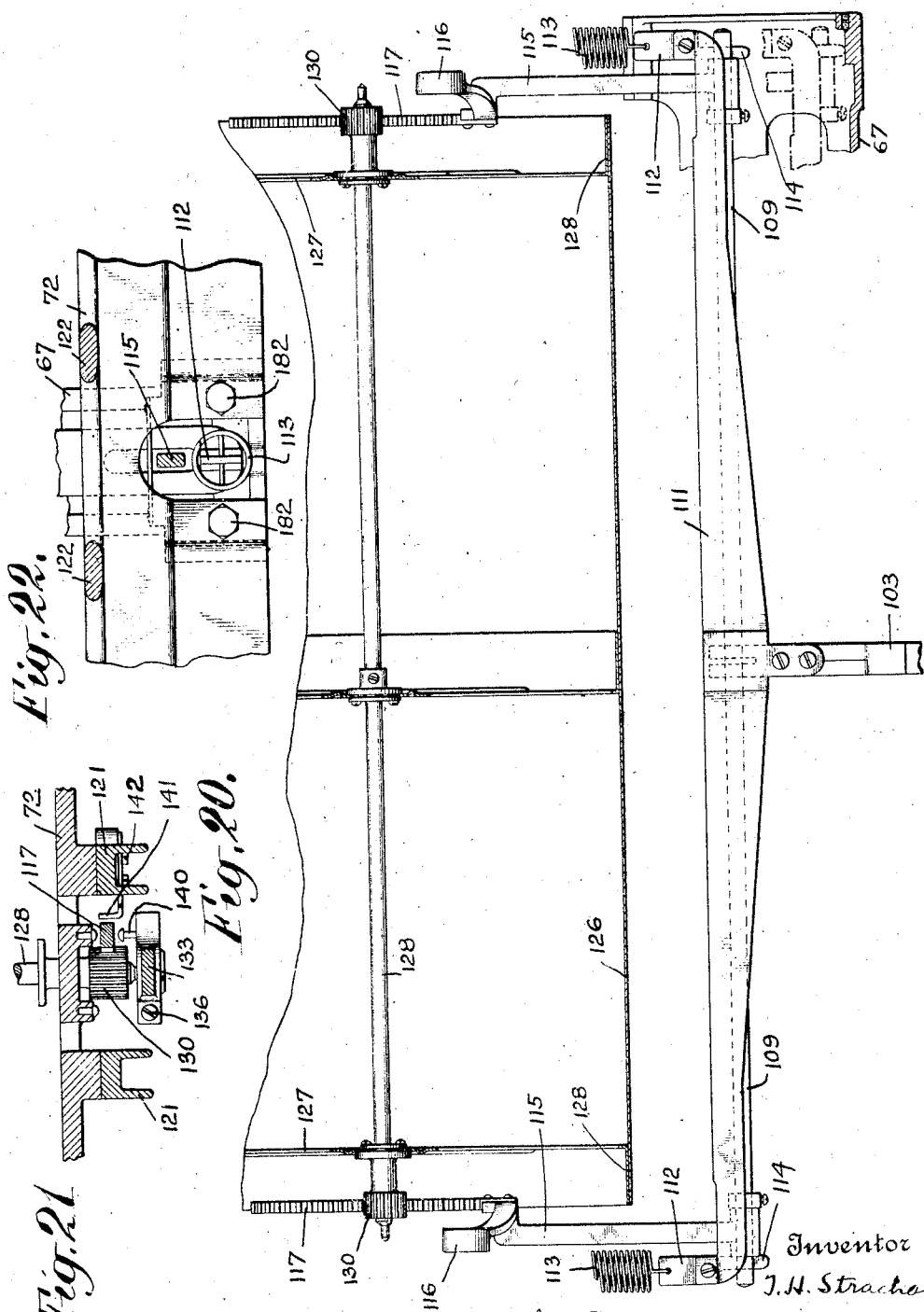

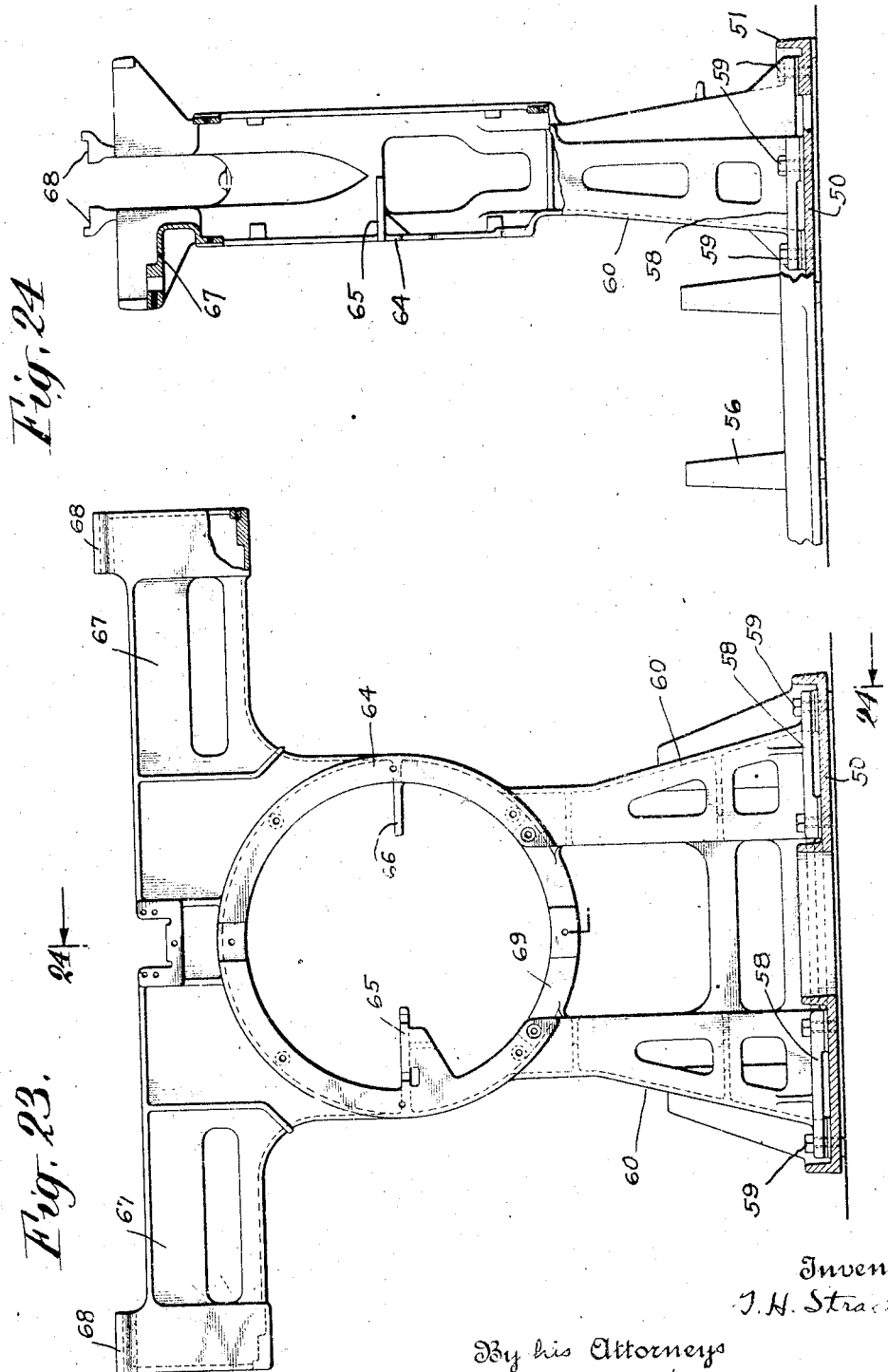

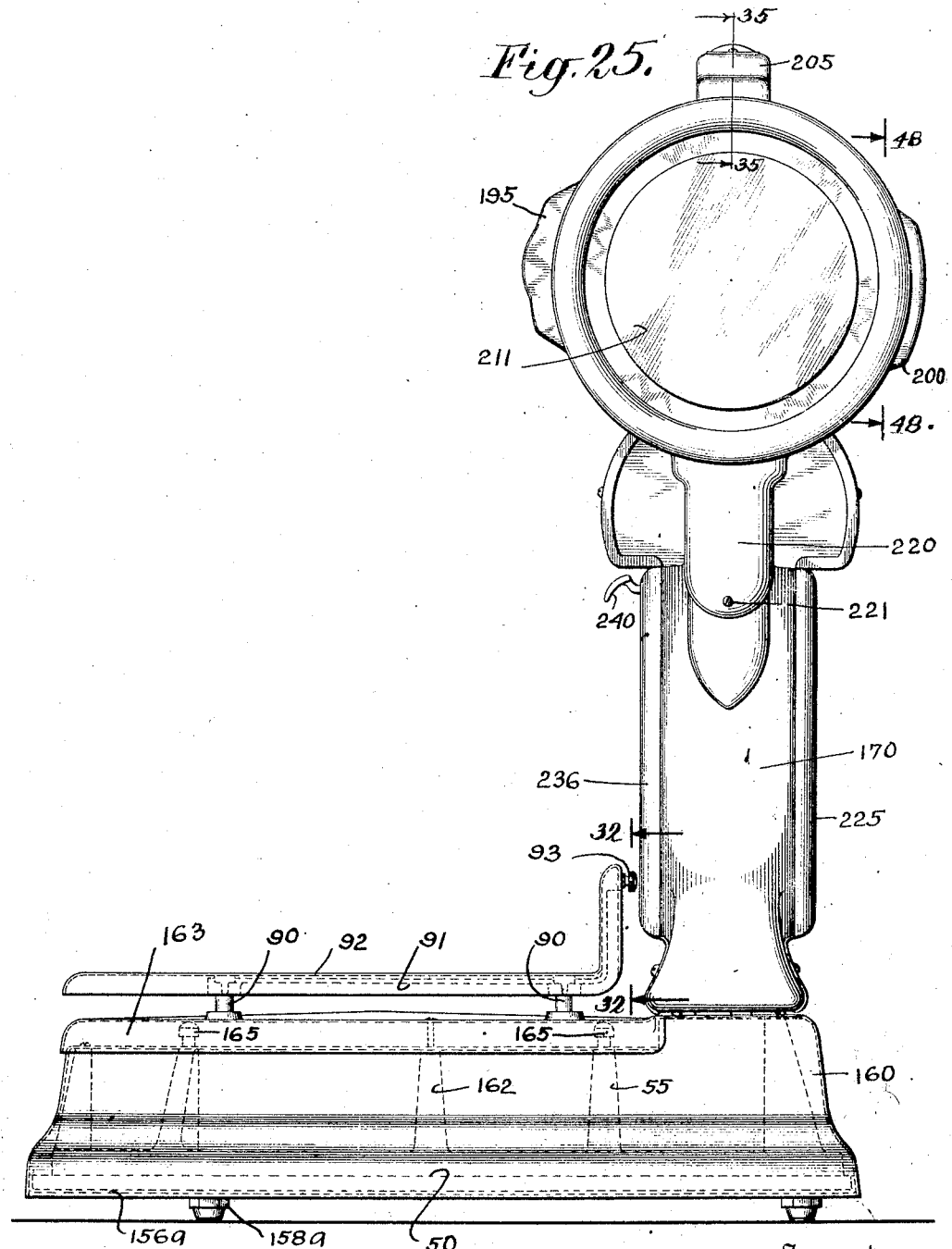

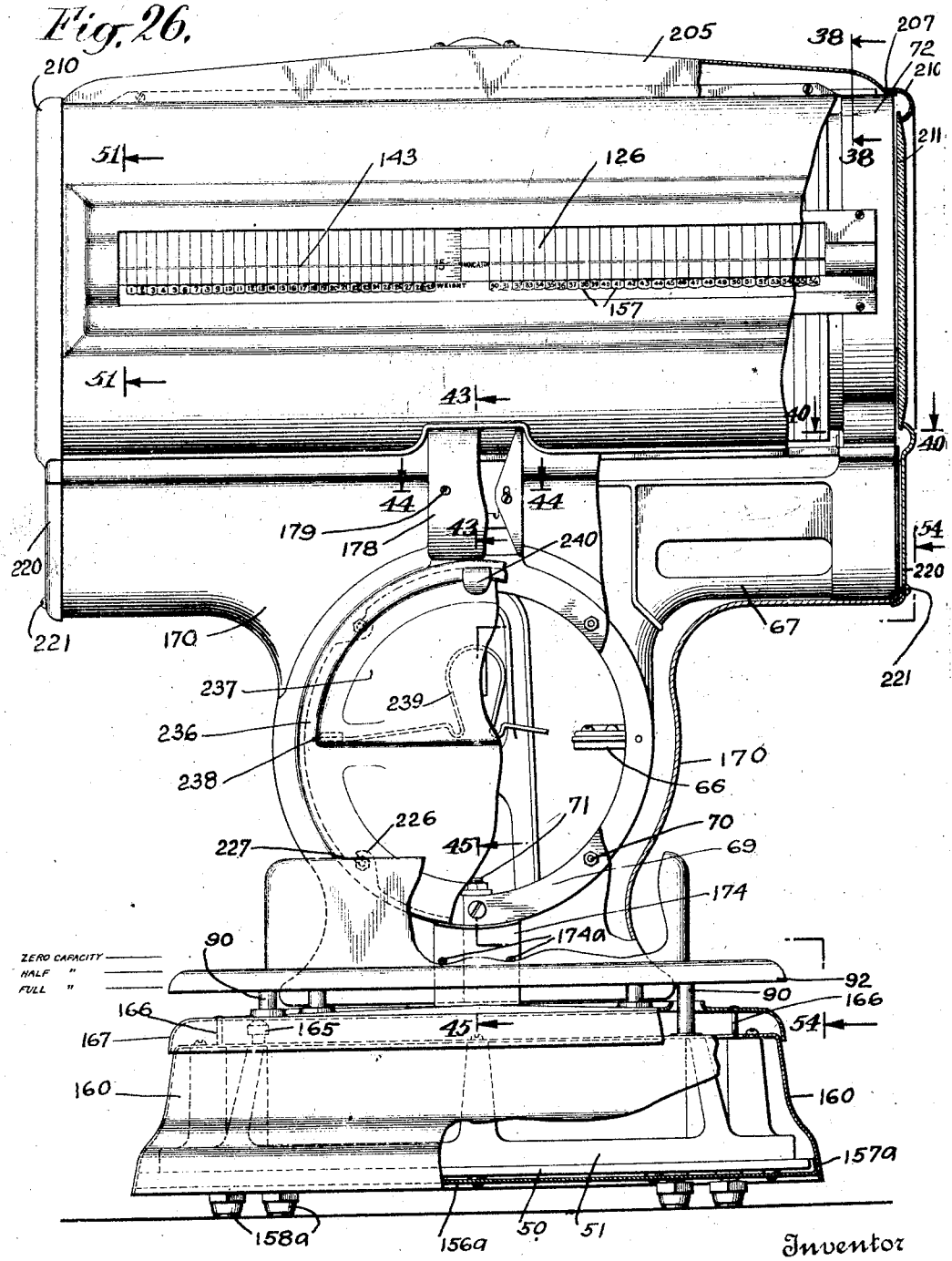

Nov. 6, 1928.

T. H. STRACHAN 1,690,258

WEIGHING SCALE

Filed Aug. 1, 1925   17 Sheets-Sheet 11

Inventor
T. H. Strachan
By his Attorneys
Cooper, Kerr & Dunham

Nov. 6, 1928.
T. H. STRACHAN
WEIGHING SCALE
Filed Aug. 1, 1925
1,690,258
17 Sheets-Sheet 12
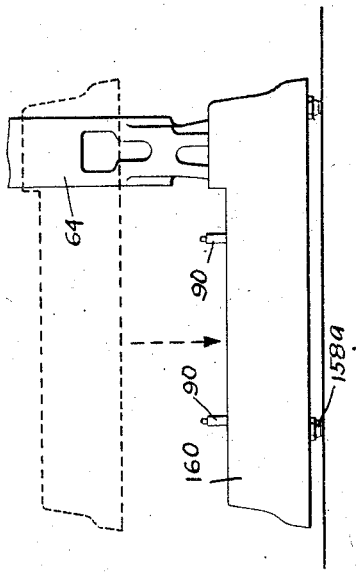
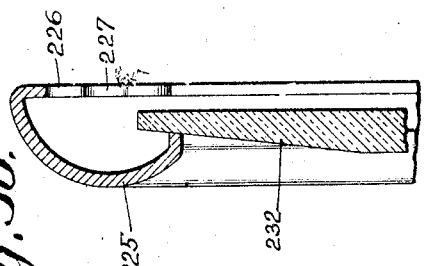
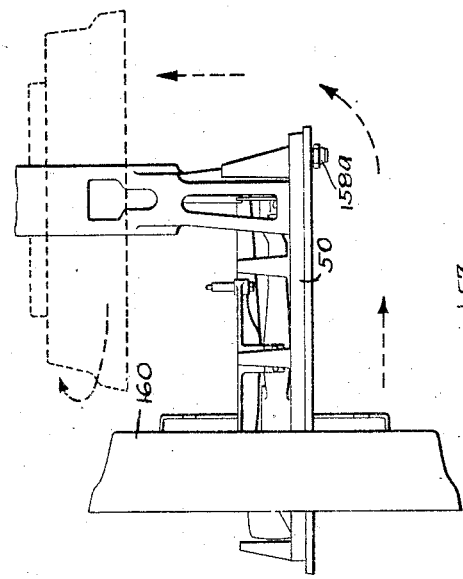
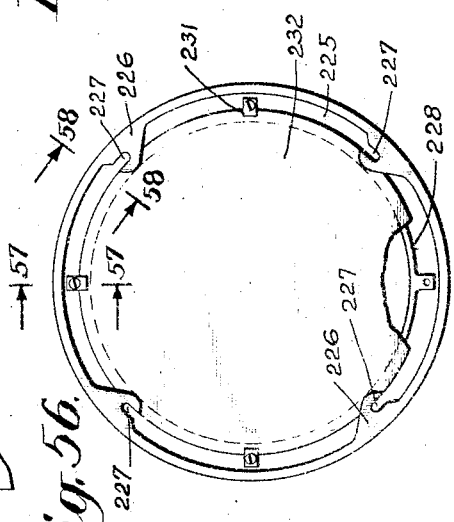
Inventor
T. H. Strachan
By his Attorney
Cooper, Kerr & Dunham

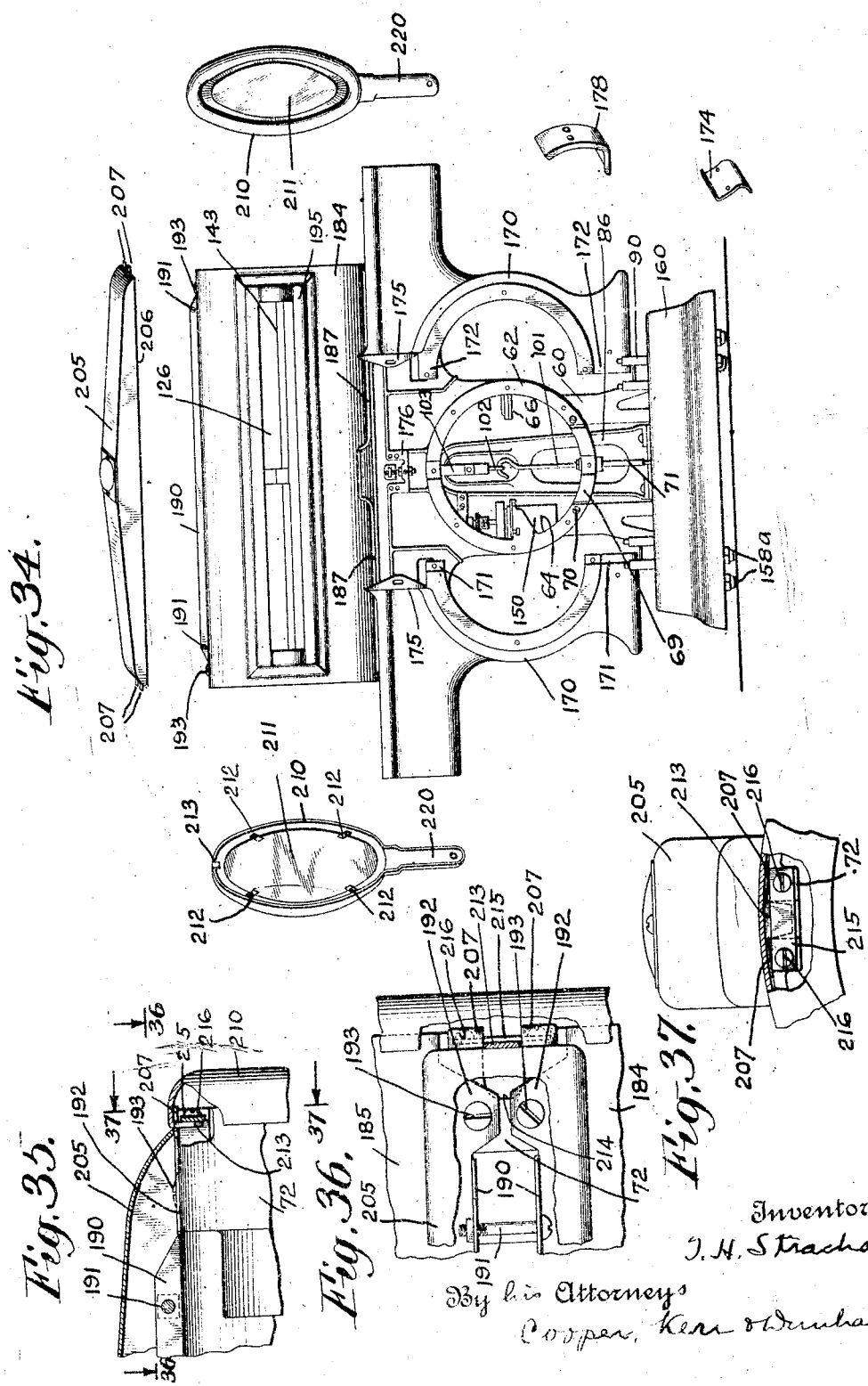

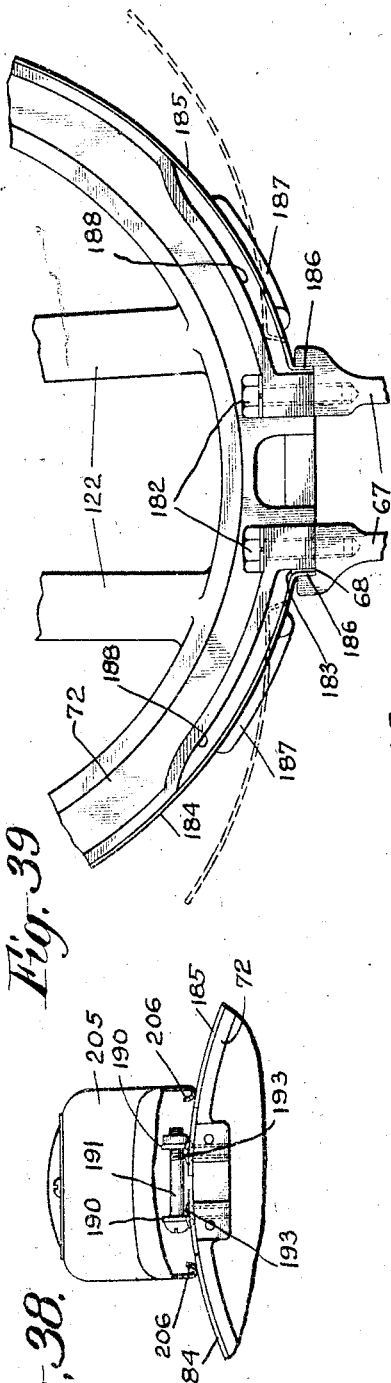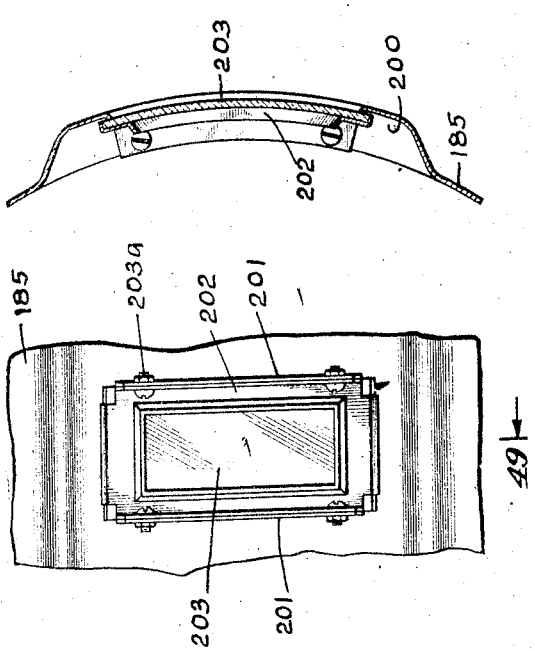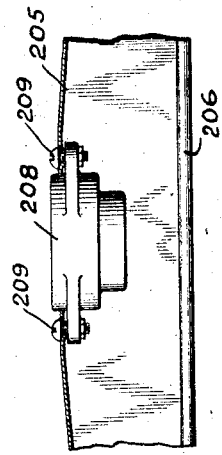

Nov. 6, 1928.
T. H. STRACHAN
1,690,258
WEIGHING SCALE
Filed Aug. 1, 1925 17 Sheets-Sheet 15
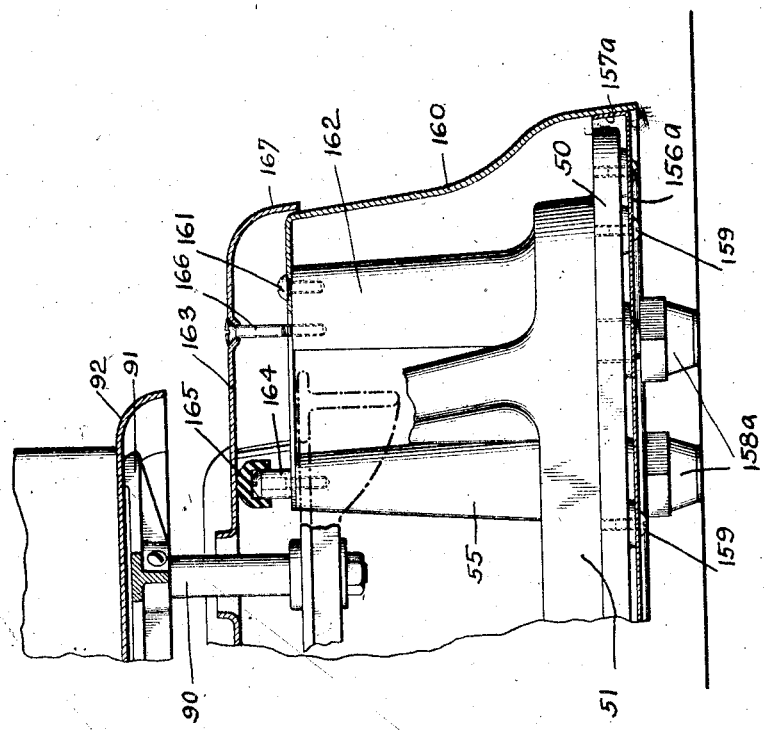
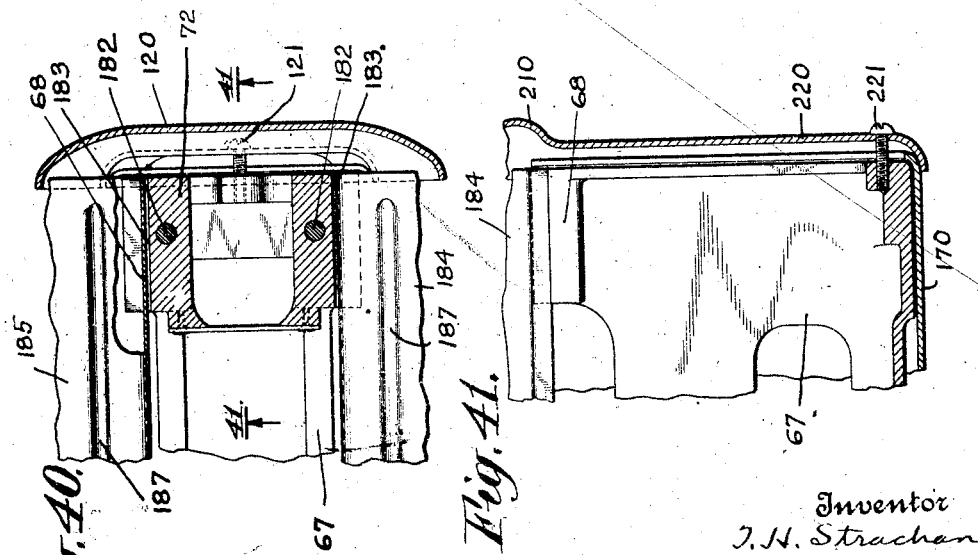
Inventor
T. H. Strachan
By his Attorneys
Cooper, Kerr & Dunham Nov. 6, 1928.  T. H. STRACHAN  1,690,258
WEIGHING SCALE
Filed Aug. 1, 1925   17 Sheets-Sheet 16
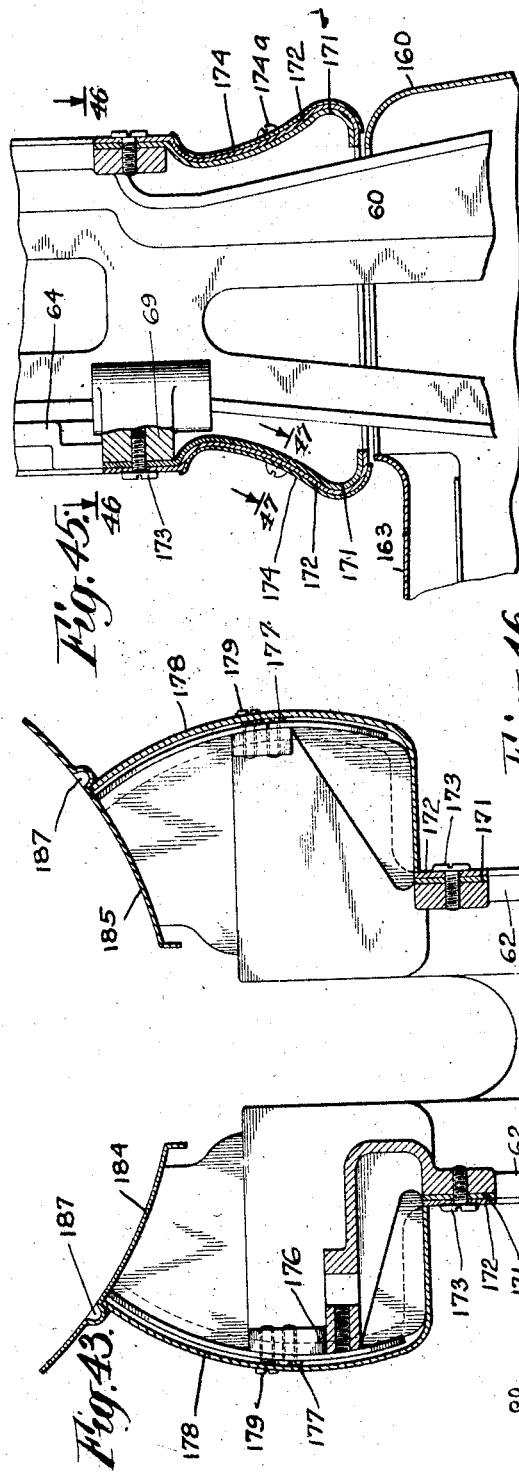
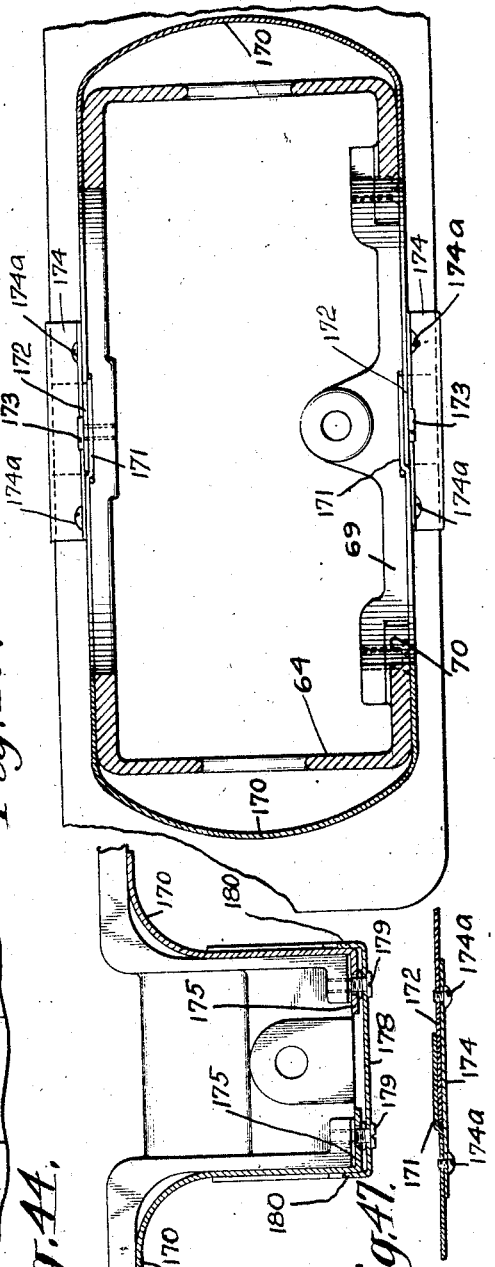
Inventor
T. H. Strachan
By his Attorneys
Cooper, Kerr & Dunham Nov. 6, 1928.
T. H. STRACHAN
1,690,258
WEIGHING SCALE
Filed Aug. 1, 1925  17 Sheets-Sheet 17
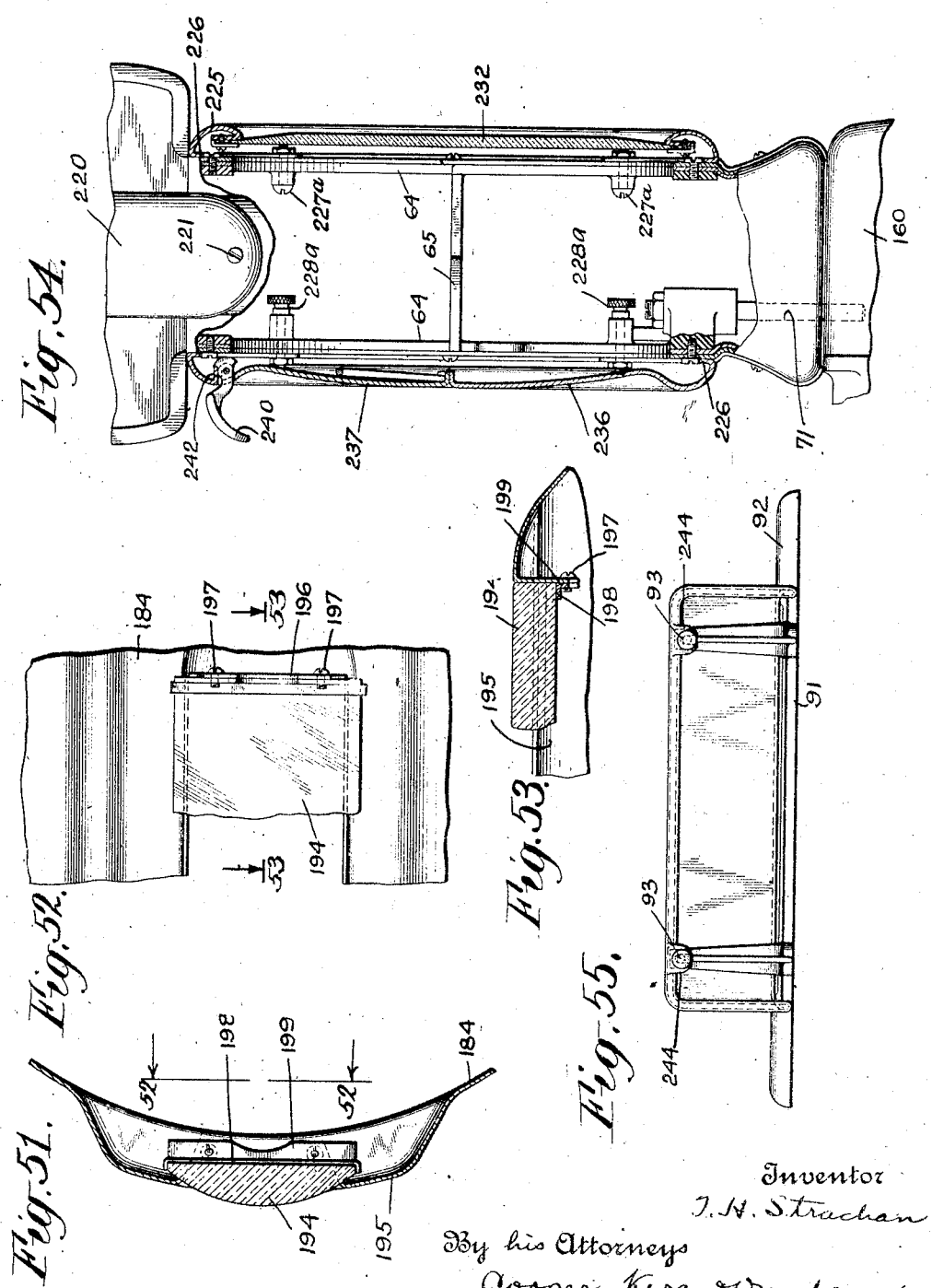

Patented Nov. 6, 1928.

1,690,258

UNITED STATES PATENT OFFICE.

THOMAS H. STRACHAN, OF DAYTON, OHIO, ASSIGNOR TO DAYTON SCALE COMPANY, OF DAYTON, OHIO, A CORPORATION OF NEW JERSEY.

WEIGHING SCALE.

Application filed August 1, 1925. Serial No. 47,472.

In the weighing scale art it is the usual practice to build up a scale in a cast iron housing which is of such character that the housing serves the dual purpose of supporting certain of the operating parts of the mechanism and encasing the same. Other housing parts such as drum covers and the like serve solely as coverings and are not intended to support the operative parts of the weighing mechanism. Inasmuch as the housings are finished in a variety of ways, for example, by painting in different colors, enameling or porcelaining it is necessary that a manufacturer keep on hand a comparatively large stock of scales to supply the demands which may arise for variously finished housings.

Generally the objects of the invention include first the provision of weighing scale of such type that the complete assembly, testing and sealing of the scale may be effected prior to the assembly of the various housing parts thereon. In this method of manufacture testing and sealing is facilitated. Furthermore, the manufacturer may build up a stock of unhoused scales into complete and tested condition. Then as calls come for scales of different colors, appropriate housings may be assembled and placed in position upon the previously completed and tested scale.

The present invention has for its further object the provision of novel forms of housings which may be readily assembled upon a weighing scale mechanism which is complete in itself and in sealed condition.

A further object of the present invention resides in the provision of novel forms of housing for the base section, the pedestal or column section and the drum section of a weighing scale. The housing parts are of such character that they may be readily assembled in position with the scale assembly complete.

Another object of the present invention resides in the provision of a construction which will permit a larger chart to be employed than heretofore. This large chart can be utilized for additional prices and in this way the so-called price capacity of the scale may be greatly increased over the scales now in general use. Provision is further made whereby the large chart will function properly and without excessive friction. This improved chart operation and the minimizing of friction effects are secured by novel methods of supporting the chart and by novel driving means therefor.

Other and more incidental objects of the present invention include the provision of an improved thermostat support; the provision of an improved dash-pot operating connection and improved location thereof to afford ready access and assembly, the provision of an improved support for the level, the provision of an improved zero adjustment for the scale, and the provision of an improved reading wire support and adjusting device therefor.

Other objects of the present invention reside in the provision of various details of construction which improve the operation of the scale as a whole and which also facilitate the manufacture of the same.

Other objects of the present invention will be more fully set forth in the accompanying specification and claims and shown in the drawings which by way of illustration show a preferred embodiment of the invention.

In the drawings:

Fig. 1 is a perspective view of the complete scale with the housing assembly thereon.

Fig. 2 is a side elevational view of the operating mechanism of the scale and the framework with the housing parts removed to show the interior construction.

Fig. 3 is a front elevational view of the scale before housing is applied.

Fig. 4 is a detail top plan view taken on line 4—4 of Fig. 3 and looking in the direction of the arrow.

Fig. 5 is a perspective view of the spider which supports the platter for the goods to be weighed.

Fig. 6 is a transverse sectional view of the pedestal or column section of the machine. The view is taken on line 6—6 of Fig. 3 looking in the direction of the arrows and particularly shows the removable part of the frame which, when removed, permits the removal of the check and other parts of the weighing mechanism.

Fig. 7 is a vertical sectional view of the parts adjacent the end of the weighing drum. This view is taken on line 7—7 of Fig. 8.

Fig. 8 is an end view of the weighing drum with the associated end castings and other parts. This view is substantially an enlarged detail view of the drum shown at the top of Fig. 2 with all parts included and shown on a larger scale.

Fig. 9 is a vertical sectional view of the ball bearing and thrust bearing for the weighing drum together with the driving pinion. This section is taken on lines 9—9 of Fig. 8.

Figs. 10, 11 and 12 are detail views of the parts used for supporting the reading wire which permit various adjustments of the same.

Fig. 10 is an end view taken on lines 10—10 of Fig. 8.

Fig. 11 is a top view taken substantially on lines 11—11 of Fig. 8.

Fig. 12 is a perspective view with the parts in dotted line position showing the reading wire displaced to a different position of adjustment.

Fig. 13 is a side view of the zero adjustment device for variably connecting the draft rod and the equalizer.

Fig. 14 is a front view of the same parts.

Fig. 15 is a front enlarged view of the connecting parts intermediate the equalizer and the main scale lever.

Fig. 16 is a side elevational view of these parts together with lever stop pin.

Fig. 17 is a view partly in section of the main scale lever. This view is taken substantially on lines 17—17 of Fig. 4.

Fig. 18 is a transverse sectional view of the column or pedestal section of the machine showing the location of the dash pot and of the level. This section is taken substantially on lines 18—18 of Fig. 3 looking in the direction of the arrow.

Fig. 19 shows the manner in which the bearing frame and vertical check column may be removed or placed in position in the scale assembly.

Fig. 20 is an enlarged detail view of the equalizer and its driving connections to the rack and pinion.

Fig. 21 is a sectional view showing on a large scale the driving pinion with cooperative rack and associated parts in horizontal section, and is taken on line 21—21 of Fig. 8.

Fig. 22 is a sectional view of the fastenings of the drum section and is taken on line 22—22 of Fig. 8.

Fig. 23 is a front view of the pedestal section of the machine with the base casting showing in section.

Fig. 24 is a view which is in part a side and in part a sectional view of the part shown in Fig. 23. The section is taken on lines 24—24 of Fig. 23.

Fig. 25 is a side view of the complete scale with housing parts in place.

Fig. 26 is a front view of the scale with casings thereon partly broken away.

Figs. 32 and 33 are diagrammatic views showing the steps taken to assemble the base housing in position on the weighing mechanism assembly.

Fig. 34 shows the steps of assembling various casing parts to the frame of the mechanism.

Fig. 35 is a detail sectional view showing the inter-relation of the top cover, the end rings or covers and the end frame castings. The section is taken on line 35—35 of Fig. 25.

Figure 29:
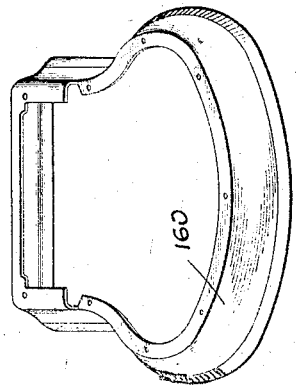
Fig. 29 is a perspective view of the base housing.

Figs. 36 and 37 are detail sectional views taken respectively on lines 36—36 and 37—37 of Fig. 35.

Fig. 38 is a detail part section view taken on line 38—38 of Fig. 26 showing the inter-relation of the top cover and the drum casing parts.

Fig. 39 is a detail view looking from one end of the drum and showing the inter-relation of the drum covers and their cooperating parts during and after assembly, the end covers being removed.

Fig. 40 is a detail sectional view taken on line 40—40 of Fig. 26.

Fig. 41 is a detail sectional view taken on line 41—41 of Fig. 40.

Fig. 42 is an enlarged detail view which shows the inter-relation and method of fastening the base cover, the base housing and roach cover to the frame parts.

Fig. 43 is a transverse sectional view of certain cover parts. The section is taken on line 43—43 of Fig. 26.

Fig. 44 shows a detail sectional view of certain cover parts and fastenings. The section is taken on line 44—44 of Fig. 26.

Fig. 45 is a vertical sectional view of other parts shown in elevation on Fig. 26. The section is taken on line 45—45 of that figure.

Fig. 46 is a sectional view taken on line 46—46 of Fig. 45.

Fig. 47 is another sectional view taken on line 47—47 of Fig. 45.

Fig. 48 is an interior view of one of the drum cover plates looking at the inside of the same and showing the details of construction of the parts which retain the customer's window glass in position. Taken on line 48—48 of Fig. 25.

Fig. 49 is a detail sectional view of the parts shown in Fig. 48, the section being taken on line 49—49 thereof.

Fig. 50 illustrates the method of supporting the socket for the wiring cables which enter the top cover space.

Fig. 51 shows a vertical sectional view of the front drum cover and shows the support for the magnifying glass. The section is taken on line 51—51 of Fig. 26.

Fig. 52 is a detail view of the front drum construction adjacent the end of the magnifying reading glass. The view is taken substantially on line 52—52 of Fig. 51.

Fig. 53 is a detail section taken on line 53—53 of Fig. 52.

Fig. 54 is a sectional view of the pedestal section of the scale taken on line 54—54 of Fig. 26 showing the assembly of the front and rear covers to the pedestal portion of the scale.

Fig. 55 is a detail view of the platform and spider and parts for connecting the same.

Fig. 56 is a detail view of the rear cover removed from the scale and showing the bayonet locks which are used to secure the cover upon the pedestal.

Figs. 57 and 58 are respectively sectional views taken on line 57—57 and 58—58 of Fig. 56.

Referring to the drawings, the framework proper of the mechanism comprises three sections; first, a base section; second, a pedestal or column section, and, third, a head or drum supporting section. The base section 50 is in the form of a casting. This casting is in the form of an open spider made so as to be as light as possible and in order to provide for adequate stiffness it is provided with suitable stiffening ribs such as those indicated at 51. The base casting is further provided with pedestals or chairs 52 (Figs. 2 and 4) to receive the agate fulcrum bearings 55. The spider is also provided with a number of pedestals 56 which support various parts of the base housing and base cover. The pedestal or column casting of the machine is best shown in Figs. 23 and 24. It comprises a base portion 58 with suitable bosses to receive bolts 59 which fasten the pedestal to the rear of the base casting 50. The pedestal tapers upwardly as indicated at 60 (Figs. 23 and 24). This section is in the form of an open box 62 (see Fig. 4) which is cored out for maximum lightness and provided with a number of stiffening ribs such as 63. Upwardly of the tapered section the column section of the machine is substantially circular as indicated at 64 and this section is provided with two shelves 65 and 66. Above the circular portion there is a transverse head portion 67 which at its ends is provided with a slotted portion 68 (Fig. 24) adapted to support the end castings which in turn support the drum. Inasmuch as certain parts of the weighing mechanism require insertion into or removal from the interior of the column section the front and lower segment of the circular portion 64 is made as a separate piece 69 (see Fig. 6). This separate piece is secured to the circular portion 64 in any suitable manner as by screws 70. This supplemental piece 69 also is utilized to support a lever stop 71 (Figs. 2 and 3).

The framework of the drum section of the machine comprises end castings 72, which end castings seat in the notched portion 68 of the transverse member 67. The end castings are preferably secured in position by cap screws 73 (Figs. 2 and 8).

*Base lever mechanism.*

The base lever 75 (Figs. 4 and 17) is of conventional construction. It includes fulcrum pivots 76 and upwardly facing load pivots 77. It is also provided with a bi-metallic thermostat 78 of the usual form. A novel mounting for this thermostat is provided comprising a U-shaped member 79, which member is rigidly riveted at its ends to the arms of the lever 75. From the thermostat suitable rods 80 connect to a single rod 81 which extends rearwardly and at its end is provided with a slide block 82 carrying a nose pivot 83. The lever is further provided with a cushioned stop 84 disposed in the top of the lever which cooperates with a stop post 71 to limit the upward swing of the lever. Post 71 is adjustably carried by frame part 69 being threaded therein and adapted to be locked after the proper adjustment is secured by means of a lock nut 71ᵃ (Fig. 16). Access to post 71 for effecting vertical adjustment is secured through door 237 (Fig. 26). Resting upon the load pivots 77 is a bearing frame 85 of conventional form. This bearing frame 85 carries an upwardly extending arm or column 86 which at its end carries a post 87 adapted to receive a check link 88 (see Figs. 2 and 19). The opposite end of this check link is carried upon a post 89 which is suitably mounted in the transverse head casting 67. Fig. 19 shows the manner in which the entire check and bearing assembly can be removed. When it is desired to remove these parts part 69 (Fig. 6) is first removed. Check link 88 is then disconnected and after this is done the entire bearing frame and check column can be removed by displacing the same as shown in Fig. 19. The bearing frame 85 is provided with a number of posts or columns 90 which in turn support a spider 91 which receives a platform or goods support 92 (see Figs. 2 and 5). The platform 92 preferably is secured on the spider by means of knurled screws 93. The arrangement of the base lever system, bearing frame and the like is such that these parts can readily be enclosed in a sheet metal base housing. Posts 90 of the bearing frame project through the base housing cover (see Fig. 1) and support the platform. In Fig. 1, 160 is the base housing and 163 is the base housing cover.

*Draft rod, zero adjustment and equalizer construction.*

Cooperating with the nose pivot 83 is an agate loop 100 which in its details of construction preferably is of the form shown in my copending application, Serial No. 23,580, filed April 16, 1925. This loop 100 at its upper end connects to a steelyard 101 (see Figs. 15 and 16) which is provided with a hook engaged in a loop 102 at the bottom of the zero adjustment device. The zero adjustment device comprises a frame 103 having slidably mounted therein a plate 104. This plate 104 at its lower end is connected by a spring 105 to the frame 103. It is further provided with an angularly disposed notch 106 with which the flat end of an adjustable stud 107 threaded in the frame 103 is adapted to cooperate. By adjusting stud 107 in or out plate 106 may be raised or lowered relative to frame 103. The plate 104 at its upper end is provided with a slot 108 adapted to receive a transversely disposed equalizer bar 109. The frame 103 is also apertured at 110 and this aperture is of such dimensions that clearance is provided to allow for the upward or downward adjustment of the equalizer bar or rod 109 relative to frame 103. Lateral clearance is provided at each side of plate 104 between this plate and frame 103. This clearance and the curved bearing of notch 108 on rod 109 provides for a slight tipping movement of transverse rod 109 (see Fig. 14). Also carried by the frame 103 at the top thereof is a transverse sheet metal channel shaped member 111 (Fig. 20) which overlies the rod 109. Part 111 at its ends is notched to receive a member 112 to which the load counterbalancing springs 113 are connected at their lower ends. Member 112 also is provided with a depending tongue portion 114 which extends down through a slot in the end of rod 109. Freely pivoted upon rod 109 adjacent tongues 114 are rack carriers 115, which carriers are provided with the usual enmeshing weights 116 and with the racks 117. The above train of parts provide for transmitting the movement of the base lever to the racks and also for applying the weight of the load to the lower ends of the counterbalancing springs 113. The device shown in Figs. 13 to 16 provides for zero adjustment. The transverse members 109 and 111 provide for free flexibility of the parts so as to apply equal loads to each spring and to bring about equal movements of the racks without binding.

The upper ends of the springs 113 are secured to a spring holder including a stud 120 (Fig. 7), which stud passes through and is supported by a U-shaped zero thermostat 121. This thermostat is disposed within the end casting 72 and is secured to vertical ribs 122 which form a part of the end casting (see Fig. 8). The thermostat is preferably secured both by dowel pins 123 and by screws 124.

In order to provide maximum horizontal width of chart with minimum overall distance between the outside ends of the end ring castings 72 these end casting members 72 are made of a peculiar configuration. As shown in Fig. 7 the end castings instead of being simply annular rings as heretofore are provided with stepped shoulders slightly reduced in diameter as indicated at 125. The usual drum chart 126 is carried on spiders 127 supported upon a drum shaft 128. As shown in Fig. 7, the end of the chart carrying spider is provided with an annular flange 129 which surrounds shoulder 125 on the end casting 72. The chart 126 also extends over the shoulder 125 of the end casting. By the provision of this overlapping construction a greater chart length can be obtained without spacing the end rings 72 further apart and without increasing the length of the drum shaft 128. Drum shaft 128 in addition to having the spider 127 carried by it also carries adjacent its ends pinions 130, which pinions enmesh with the driving racks 117. To rotatably support the drum shaft 128 the ball bearings 131 (Fig. 9) are provided. These ball bearings are carried by a cup 132 which is exteriorly threaded to permit in or out adjustment of the same relative to a bracket member 133, which bracket member is secured by screws to a boss 134, which forms a part of the end casting. As shown in Fig. 9 the end of shaft 128 is pointed and this pointed end abuts against a face 135 of cup 132. It will be understood that by adjusting both of the cups 132 at each end of the drum shaft in or out the drum shaft and the chart may be longitudinally adjusted to the desired position. After the adjustment is once secured the cups 132 can be locked in position by tightening up a clamping screw 136 so as to clamp the split bracket 133 firmly to the cup 132. For convenience in adjusting the cup 132 it is provided with a slot 137 adapted to receive a screw driver or like implement.

Bracket 133 also carries a suitable post 140 (Fig. 21) which acts as a stop to prevent excessive lateral displacement of rack 117. An adjustable limiting stop 141 is also provided disposed a short distance from the rear of the rack to prevent the de-meshing of the rack and pinion. This limiting stop 141 may be adjusted in and out by means of the slot and screw adjustment 142 (see Fig. 8).

As shown in Fig. 7 the rack and pinion 117—130 are disposed within the end casting 72 within the reduced annular portion 125 thereof. By offsetting the rack 117 relative to the carrier 115 connection may be made with rod 109 at a point beyond the end of the chart 126.

By the construction just described it is possible to utilize a computing chart having a greater width than heretofore. In this way a greater number of columns of computed values can be obtained on the computing chart than in previous scales. Not only can these extra columns be obtained on the chart but the chart can operate properly without excessive friction due to inertia and mass of the parts. In weighing scales having drum charts the weight of the chart is an important element and it is extremely desirable that the mass of rotating parts be kept to a minimum. Increase in length of the drum shaft should be avoided as this introduces additional mass into the rotating parts. Furthermore excessively long shafts are subject to bending strains since it is essential that they be supported at their ends. The peculiar end ring construction, with a part of the end ring extending inside the drum, as herein disclosed, permits the keeping of the drum shaft short while at the same time permitting the attaining of the greater width of the chart than heretofore.

*Reading wire and manner of adjusting same.*

With computing scales of the drum type it is the customary practice to provide a reading wire which is disposed transversely across the value graduations on the chart and which serves as an index to permit the user of the scale to read the price or weight. This reading wire preferably should be as close to the chart as possible to prevent parallax. It should, however, not touch the chart as it will cause friction or damage the chart. It should be maintained taut to prevent sagging and kinking of same. The construction which is employed to permit these various adjustments of the reading wire will now be described. Each end casting 72 is provided with a boss 140$^A$ (Figs. 8 and 10), which boss is provided with a flat surface (see Fig. 11). It is also provided with a threaded hole 141$^a$ to receive a screw 142$^a$. 143 designates the reading wire. This reading wire passes over a notch 144 (Fig. 12) in an L-shaped sheet metal member 145 and is secured to this member by means of fastening screw 146. The L-shaped member 145 is longitudinally slotted as indicated at 147 to receive the shank of the screw 142$^a$. An additional screw 148 is also threaded in the member 145. As shown in Figs. 10 and 11 the L-shaped tail portion 149 of the member 145 is provided with sharp corners which bear upon the surface of the boss 140. By loosening the two screws 148 and 142$^a$ the reading wire can be adjusted in or out or up and down as desired. After the adjustment is secured the adjustment may be locked by tightening up on the screws 142$^a$. Screw 148 is particularly intended for the adjustment of the tautness of the reading wire. It also cooperates with the other screw 142$^a$ in holding member 145 in position after an adjustment is secured.

As shown in Fig. 8 and 2, the reading wire passes through notches 260 in the end castings 72. Thus the reading wire is disposed below the periphery of the castings 72 and is protected by these castings. The construction enables the cover parts to be assembled with the reading wires in place without any possibility of these wires being damaged or dislocated while the drum covers are being assembled. The adjustments and replacements of the reading wires can be effected from the outside of the end castings as the bosses 140$^a$ are disposed upon the outer surfaces thereof and the notches 260 permit the wires to be passed through the end castings.

Weighing scales of the counterbalanced type require a dash pot to prevent excessive oscillation of the same and such dash pots require accessibility for adjustment. In the present construction the dash pot 150 is preferably supported by the shelf 65 on the column section of the machine. Operating connections to the dash pot are secured by means of a member 151 which is fastened to the check standard 86 (see Figs. 18 and 3). This particular dash pot location provides for ready accessibility inasmuch as access may be readily had to the interior of the column section of the machine. It is also the practice to provide level devices in weighing scales of this class. In order to mount this level in an accessible and visible location level device 152 is preferably provided on the shelf or bracket 66.

In order to assist in reading the various computed values on the drum a suitable price bar or plate is usually provided. This price bar is shown in Fig. 3 and comprises a sheet metal plate 155 preferably secured by screws 156 to the end castings 72. Plate 155 is provided with the usual price designations 157 and to provide for the alignment of these prices with the columns of prices on the drum chart the member 155 is preferably slotted as indicated at 158. These slots permit lateral shifting of the price plate to align the prices 157 with the columns on the chart. After the adjustment is secured the screws 156 may be tightened to hold the price plate in proper position.

The scale herein shown and described may be built up as a complete weighing mechanism, tested and sealed without the application of any housing parts whatsoever thereto. These various housing parts may then be applied to the scale. It is possible to make up this assembly complete and test it, seal it and after this is done such scales may be kept in stock and at any time supplied with the desired casings. The demand for types of casings widely vary and it is accordingly possible to manufacture the weighing assembly complete without requiring housings to be incorporated in the construction as the manufacture of the weighing assembly proceeds.

Certain features of the present invention are directed to improvements in coverings, casing parts and like appurtenances of such character that they may be readily assembled in position upon the completed and sealed weighing scale unit or assembly.

The first step in the assembly of the cover parts is to place the roach cover 156ª in place under the base casting 50. Casting 50 is an open frame of spider-like construction for lightness. The roach cover 156ª forms a bottom closure for the scale and prevents the access of dirt, vermin and the like to the mechanism in the subsequently housed base. Preferably this roach cover is provided with an upturned edge or flange 157ª beveled as shown in Fig. 42 to closely fit the sloping interior surface of the base housing. Part 156ª is preferably ribbed for stiffness and is apertured to permit the feet of the scale (see 158ª, Fig. 42) to pass therethrough. The cover is held in position by screws 159 (Fig. 42).

Preferably the next step of the assembly is to secure the sheet metal base housing 160 in position. Inasmuch as the weighing mechanism is of peculiar configuration and disassembly of it is highly undesirable, this housing is turned edgewise permitting the major diameter of the opening at the top and bottom thereof to extend horizontally. The housing is then passed over the scale base assembly as indicated by the dotted line arrows in Figs. 32 and 33. The housing is first displaced rearwardly, then tipped angularly, then elevated, then twisted in a horizontal plane and then lowered (see Fig. 33). It is finally fastened by screws 161 (Fig. 42) to bosses 162 which are a part of the base casting. The base cover 163 (Fig. 30) may now be placed in position. Suitable studs 164 are threaded into certain of the bosses 162. Rubber compressing elements 165 are fitted on these studs and the cover is placed in position and held by screws 166 which take into the bosses 162. As shown in Fig. 42, the cover is flanged at 167 to extend slightly beyond and overlap the top of the base housing. In tightening the screws 166 the rubber elements 165 yield and allow the cover to be drawn down tightly without damaging the paint or enamel upon housing 160.

Subsequent assembly steps include the placing of the platform spider 91 in position and the subsequent locating of the platform 92 thereon. The subsequent assembly steps may be varied.

Either the drum cover parts may be assembled or the column casing parts can be first placed in position. The pedestal or column housing includes two parts designated 170 (Figs. 34 and 46). These parts are assembled by being laterally displaced toward one another and in a horizontal direction with respect to the column or pedestal 62. For cheapness in manufacture these parts are preferably of sheet metal construction and are provided respectively with offset flanged portions 171 and cooperating straight portions 172 (see Figs. 46 and 47). The pedestal housing parts 170 are adapted to be slidably displaced towards one another as indicated in Fig. 34 and eventually parts 171 and 172 overlap in the manner indicated in Figs. 46 and 47. After these parts are overlapped they are secured to the pedestal housing frame 64 by a suitable screw fastening 173.

Figure 27:
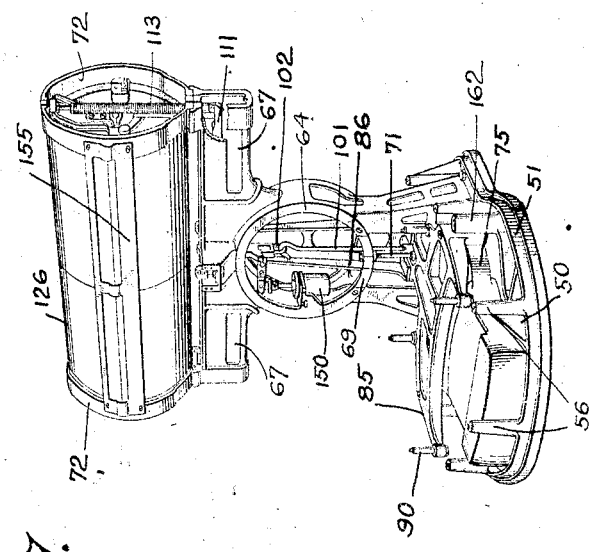
Fig. 27 is a perspective view of the complete weighing scale mechanism assembly complete and in sealed condition ready for the reception of the various casing parts.
Figure 28:
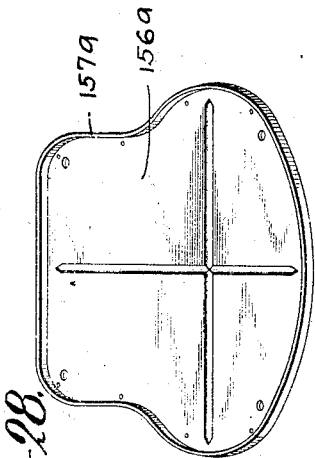
Fig. 28 is a perspective view of the so-called roach cover or bottom plate which covers the bottom of the frame.

To conceal the seam I preferably provide a sheet metal plate 174 (Fig. 34), which plate may carry the patent designation, name or the like. This plate is secured in position over the lower junction of elements 170 by means of screws 174ª. The parts 170 also overlap at the top at 171, 172, and these parts are likewise secured to the frame of the pedestal by screws 173 (see Fig. 43). Parts 170 are further provided with tab portions 175 (Fig. 34). These parts are adapted to fit over and be secured to the brackets 176 which form a part of the transverse heads 67 (see Fig. 27). The tab portions 175 are secured to the brackets 176 in any suitable manner as by screws 177 (Fig. 43). To conceal the junction of the two parts 170 adjacent the tabs 177, supplemental plates 178 (Fig. 34) are provided, which plates at the front and back are secured in position by suitable screws 179. Preferably these plates 178 have a channel-like edge 180 which extends down over the corner of the tab 175 and the main body portion of parts 170 (see Fig. 44). As clearly shown in Fig. 43, the parts 170 at the front and back closely abut the frame 64. In this way rigidity of construction is secured after the parts are assembled together. As previously explained the end ring castings 72 are carried by the transverse head 67. Referring to Fig. 39, the end casting 72 is secured in a slot 68 in the transverse head casting 67. The end castings are preferably secured in position by suitable bolts 182. A slight clearance is provided between the foot of the end casting and the edge of the transverse head member. This clearance is indicated at 183 in Fig. 39. The drum housing includes front and back sheet metal plates 184 and 185 substantially of semicircular contour and provided with lips 186 at the lower edges thereof to interengage the socket provided by the clearance space 183 intermediate the foot of the end castings and the transverse casting 67. Both drum portions 184 and 185 are provided with beading 187 more clearly shown in Fig. 34. The purpose of this beading is to obscure the junction between parts 170, 184 and 185.

In order to place the parts 184 and 185 in position without marring the paint or enamel on this beading the end castings 72 are provided with clearance designated at 188 in Fig. 39. This clearance is such that parts 184 and 185 can readily be assembled in position after parts 170 are secured in position. It will be understood that, if desired, parts 184 and 185 can be placed in position first and then parts 170 secured in position. In order to secure the front and rear drum covers 184 and 185 together at the top these parts are provided with flanged portions 190 (see Figs. 35 and 36), which flanged parts receive through fastening bolts 191. In order to also provide additional support for the drum covers and to provide a transverse stay at the top for the two end castings 72 these drum covers are each provided with tab portions 192 which receive screws 193 threading into the end castings 72.

As usual in computing scales of this type the front drum cover 184 is provided with an elongated opening to receive a magnifying glass 194 (Fig. 51). To provide for the reception of this magnifying glass the cover 184 is provided with a stamped depression 195. At the ends of the lens 194 the sheet metal is turned inwardly as indicated at 196 (Figs. 52 and 53) and to this turned-in portion there is secured by suitable screws 197 a flanged sheet metal member 198 having lipped portions 199 at the ends thereof which are turned in and around so as to embrace the lens or magnifying glass 194. In this way an extremely simple and inexpensive mounting is provided for supporting the magnifying glass 194 in the front drum cover 184. It will be understood that the magnifying glass 194 will be secured in position before part 184 is assembled in position.

Referring now to Figs. 48 and 49, the rear drum cover is provided with a stamped socket portion 200 and the turned-in ends 201 have secured thereto a sheet metal element 202 which is arranged to embrace the glass 203. Glass 203 forms the customer's reading opening of the scale. Parts 202 are secured to parts 201 by suitable fastening means such as screws 203ᵃ.

The next step in the assembly of the housing parts comprises the assembly of the top cover which conceals the upper flanges 190 and associated parts. This top cover is preferably a sheet metal stamping and is designated as 205 in Figs. 34, 35, 36, 38 and 50. Preferably but not essentially the lower edges of this top cover box are provided with reversely turned beading 206 (see Fig. 38). The top cover box is further provided with tongue portions 207. These tongue portions fit under the edge of the end ring as will be hereinafter described. In the event that the scale is of the electrically illuminated type a suitable electric socket for the reception of a lamp cord may be provided in the top cover 205. The method of fastening socket 208 in position is shown in Fig. 50, suitable screws 209 being provided for this purpose.

In order to complete the enclosing of the drum, end rings 210 (Fig. 34) are provided. These end rings, if desired, may carry decorative mirrors 211. If mirrors are provided in these rings the mirrors may be retained in place by suitable clips 212. At the top each end ring is provided with a depending tongue portion 213. The end castings 154 are provided with a socket 214 (Fig. 36) at the top thereof, which socket is bridged by a transverse sheet metal piece 215 fastened to the end rings by screws 216. When the end ring is to be assembled in position the tongue portion 213 is fitted behind the sheet metal strip 215 thus forming an interlock. The end ring also rests upon the top of the tongues 207 and thus secures the top cover in place. The flange of the end ring further overlies the edges of the front and rear drum covers 184 and 185. The end ring at the lower end (see Figs. 26 and 34) is provided with a depending portion 220 which fits over the edge of the column housing 170. The end rings may be secured in position by a single screw such as 221 (Figs. 26 and 41) which fits into a threaded opening in the end of the transverse member 67 (see Fig. 41).

To close in the front and back circular openings in the column section of the machine, front and rear closures are provided. These in their method of attachment to the pedestal or column section 64 of the assembly are quite similar. Referring to Figs. 54 to 58 inclusive, the rear cover comprises a sheet metal frame member 225 having a portion 226 thereof turned inwardly and provided with bayonet sockets 227 adapted to receive fastening screws 227ᵃ (Fig. 54) which are carried by the column section 64 of the machine. The frame 225 is further provided with an inwardly turned lip or flanged portion 228 (Figs. 57 and 56), which portion is provided with tab portions 229 receiving screws 230 which hold clips 231 in place. Clips 231 securely fasten the glass panel 232 in position. This panel of course may be a mirror, if desired, for purposes of ornamentation. The front cover comprises a frame member 236 (Figs. 54 and 26), which frame member is provided with an inwardly turned portion 226 similar to that on the rear cover having bayonet slots therein to receive fastening bolts 228ᵃ. Frame member 236 at its upper portion is provided with a semicircular door 237 hinged at 238 to the member 236 and provided with a spring 239. A suitable catch 240 (Fig. 54) is carried by the door 237 and engages the edge of lip 242. It will be understood in assembling the front and rear covers in place that upon opening door 237 access may be had to the thumb bolts 228ᵃ. These can be loosened by hand and the front cover then removed by slightly twisting the same to free it from the bayonet fastenings. After the front cover is removed the screw-driver or other implement can be applied to the screws 228 to loosen them so that the rear cover can be removed in a similar manner by twisting. Assembly is effected by carrying out the above operations in reverse order.

Fig. 55 shows the manner of mounting the platform 92 on spider 91. The rear portion of the platform 92 is provided with the depending tab portions 244 recessed to receive knurled end screws 93 (see Fig. 2). These screws are carried by the bosses of the spider 91. By tightening the screws the platform can be securely fastened in position on the spider.

Figure 30:
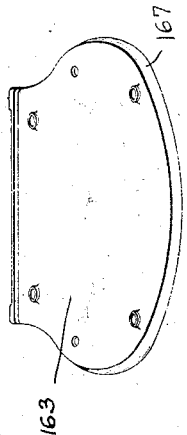
Fig. 30 is a perspective view of the base cover.
Figure 31:
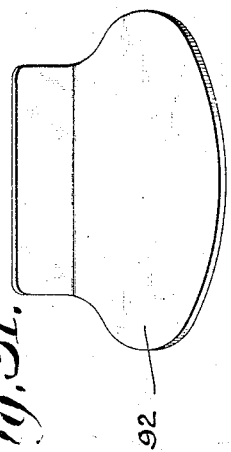
Fig. 31 is a perspective view of the platter.

Referring to Fig. 45 it will be noted that the column housing parts 171 and 172 together with associated supplemental parts 174 are entirely independent and separate from the base housing 160 and the base cover 163. The construction provides for ready porcelaining of the parts and for the subsequent prevention of chipping or damaging the porcelain or other finish upon the parts. All finished parts are prevented from contacting engagement such as heretofore exerted when the column housing parts were supported from the base housing parts of the scale. Furthermore, the arrangement and configuration of the parts is such that the scale may be readily washed without the possibility of water entering the interior and giving access to the mechanism. The base cover 163 preferably is crowned as shown in Figures 25 and 30 to direct any wash water out and over the edge of the base cover.

I claim:

1. A weighing scale construction, including the combination with a weighing scale assembly complete in itself and built up in completely assembled and sealed condition as an operative weighing device, of cover devices therefor comprising base casing elements, column casing elements and drum casing elements, said elements being constructed to be assembled and secured to the weighing scale assembly after the latter has been sealed.

2. A weighing scale construction including in combination, a base, a weighing scale assembly which is complete in itself and capable of being sealed for accurate weighing independently of the assembly thereon of casing parts, said assembly being mounted on said base, and removable casing parts constructed for atachment to said assembly and base to encase the same.

3. A weighing scale comprising in combination, a base, a weighing assembly complete in itself and in sealed condition, and a plurality of housing members adapted for attachment to said assembly and base to encase and house the same, said members being constructed to fit upon and be secured to said weighing assembly after the latter has been tested and sealed without disturbing or otherwise effecting the adjustment thereof.

4. In a weighing scale the combination with a weighing scale assembly comprising a skeleton-like base section, a column section secured thereto, and a drum section secured upon said column section, of housing parts adapted to encase and house the said sections, said parts including a base housing, column housing means and drum housing means.

5. In a weighing scale the combination with a weighing scale assembly having an intermediate column frame section, of housing means therefor comprising a pair of sheet metal cases arranged to interengage with each other and having provision for securing the same together and to the column frame section.

6. A weighing scale of the drum type having a base casting supporting a column frame section thereon and base levers thereon, and a base casing having an open top and open bottom, said casing being constructed so as to be assemblable over the base casting when the base levers are in position thereon and with the column frame section secured thereto.

7. A weighing scale including a base casting section supporting a base lever system, a column frame section secured to the base section, and a base housing for said base casting and base lever system, said housing being open at the top and bottom and having the major diameter of such openings of such dimensions as to permit the passing of the housing over the base casting when the latter has the base lever system and column frame associated therewith.

8. A weighing scale including a base casting supporting the base lever system of the scale and a column section, and a base housing having a base cover associated therewith, said housing and base cover being adapted to encase the base parts of the scale, said base housing being constructed to be assembled in position with the cooperating parts supported upon and connected to the base casting.

9. A base construction for a weighing scale comprising a supporting base casting, a sheet metal base housing secured thereto and a base cover also secured to said base casting.

10. A base construction for a weighing scale, comprising a base casting in the form of a frame having an open spider-like construction, and means for housing said frame and associated parts comprising a bottom roach cover plate, a base housing and a base cover, said plate housing and cover being secured to aforesaid base casting.

11. A column construction for a weighing scale comprising a column frame section, a pair of sheet metal column housing members adapted to be fitted to said column frame member and to be removable therefrom, and means for securing said housing members in position upon said column frame section.

12. A column construction for a weighing scale comprising an interior column frame section having laterally extending head portions and means for housing said frame, comprising a pair of removable housing members with provisions for encasing the column section and the head section of the aforesaid frame.

13. A weighing scale comprising a drum section having front and rear sheet metal drum covers, end rings for supporting said drum covers, said end rings having relieved portions to provide for clearance when the drum covers are tipped in applying or removing the same.

14. A weighing scale having a drum cover of sheet metal apertured to receive a transparent element such as a reading glass, said drum cover having a recess formed therein in which said reading glass is located and means carried by integral extensions of the drum cover walls for supporting said reading glass in said recess.

15. A cover for an opening in the pedestal of a weighing scale, said cover having an inwardly turned flange portion, clips carried thereby and a panel member retained in position against the surface of said flange portion by the said clips.

16. A cover for an opening in the pedestal of a weighing scale having a pedestal frame comprising a frame member having a bayonet and slot connection with the pedestal frame of the scale, said frame member having a hinged door thereon and a catch on said door engaging a lip on said frame.

17. A weighing scale having a recessed sheet metal drum cover, means for supporting a glass member in said drum cover, said means comprising inwardly-turned end portions integral with the drum cover, and a glass supporting element secured to said end portions.

18. A weighing scale base construction, comprising a supporting base casting having pedestal-like bosses thereon, a base housing carried by said bosses, a bottom cover secured to said base casting and having a flanged portion fitting against and cooperating with the base housing.

19. The invention set forth in claim 18, in which a base cover is provided and in which means are provided for securing said base cover to the bosses of the base casting.

20. A weighing scale base construction comprising a supporting base casting having pedestal-like bosses thereon, a base housing having a flanged portion secured to said bosses, and a base cover having a flanged periphery spaced from the edge of the base housing and also secured to said bosses.

21. The invention set forth in claim 20, in which resilient means is provided intermediate the base casting and the base cover for the purpose described.

22. A weighing scale housing construction, said scale having drum housing members, a pedestal housing member, and an end ring member fitted over the ends of the drum housing member and having an extended portion fitted over the ends of the pedestal housing member.

23. A weighing scale having a column section with extended head portions, end frame members carried thereby, drum housing covers carried by said frame members, and an end closure for said drum, said closure being secured to said end frame member and to said extended head member.

24. A weighing scale housing construction comprising supporting end castings for the drum, drum covers carried thereby and secured thereto, a socket in said end casting and an end ring drum cover member having a tongue fitting in the aforesaid socket, said end ring extending over the end portions of the drum cover elements.

25. A drum type automatic weighing scale comprising a skeleton-like base casting, a pedestal framework carried thereby, end castings supported by said framework and supporting the indicating drum and load counterbalancing devices, a base lever supported on said base casting, and a check standard within said pedestal, said pedestal framework having a removable section to permit insertion of and removal of the check standard into and from said pedestal framework.

26. A weighing scale of the drum type including a framework for certain of the operative parts of the scale mechanism, said framework including a base casting and a hollow box-like pedestal or column section secured thereto, said pedestal or column section being provided with supplemental integral ribs for stiffening the same.

27. A weighing scale including separate housing parts and frame members for independently supporting the operative parts of the weighing mechanism and said housing parts, said housing parts including a base housing, said frame members including a base casting and a pedestal frame directly bolted thereto and independent of the base housing and of its connection to said base casting.

28. A weighing scale having a base housing and a base cover both supported by a base casting and cushioning means interposed between the base cover and the base casting to yield when the cover is being secured in position.

29. A weighing scale having a hollow pedestal section enclosed by cover members, one of said members having a door associated therewith, an interior shelf on said pedestal section, and a level supported by said shelf and viewable through the aforesaid door.

30. A weighing scale assembly including a base, a pedestal portion carried thereby, an indicating drum supporting means carried by the pedestal portion, a complete set of operative parts of a scale supported by the aforesaid parts and adapted to be built up thereon in completely assembled and sealed condition as an operative weighing device, before any operative parts are encased, in combination with housing parts adapted for subsequent application to said base, to the pedestal and to the drum supporting means to encase and house the base, the pedestal, and the drum.

31. A weighing scale construction, including in combination, a weighing scale assembly complete with lever system, counterbalancing devices and indicating drum, said assembly being complete in itself and built up in completely assembled and sealed condition as an operative weighing device; housing devices for said assembly including column casing elements and drum casing elements, said elements being constructed to be assembled and secured to the weighing scale assembly after the latter has been sealed.

In testimony whereof I hereto affix my signature.

THOMAS H. STRACHAN.